(12) United States Patent
Misaka

(10) Patent No.: US 8,320,053 B2
(45) Date of Patent: Nov. 27, 2012

(54) ZOOM LENS

(75) Inventor: Makoto Misaka, Yokohama (JP)

(73) Assignee: Samsung Techwin Co., Ltd., Changwon (KR)

( * ) Notice: Subject to any disclaimer, the term of this patent is extended or adjusted under 35 U.S.C. 154(b) by 248 days.

(21) Appl. No.: 12/787,685

(22) Filed: May 26, 2010

(65) Prior Publication Data

US 2010/0302651 A1 Dec. 2, 2010

(30) Foreign Application Priority Data

May 29, 2009 (KR) .................. 10-2009-0047575

(51) Int. Cl.
G02B 15/14 (2006.01)

(52) U.S. Cl. ........ 359/690; 359/684; 359/685; 359/687; 359/689; 359/715; 359/716; 359/740; 359/774

(58) Field of Classification Search .......... 359/683–687, 359/689, 690, 715, 716, 740, 774, 785
See application file for complete search history.

(56) References Cited

U.S. PATENT DOCUMENTS

2007/0279764 A1* 12/2007 Hoshi ........................ 359/687
* cited by examiner Primary Examiner — Evelyn A. Lester
(74) Attorney, Agent, or Firm — Sughrue Mion, PLLC

(57) ABSTRACT

A zoom lens including, in a sequence from an object side, a first lens group having a positive refractive power, a second lens group having a negative refractive power, and a succeeding lens group having an overall positive refractive power, and having a high zoom magnification and a compact size.

19 Claims, 16 Drawing Sheets

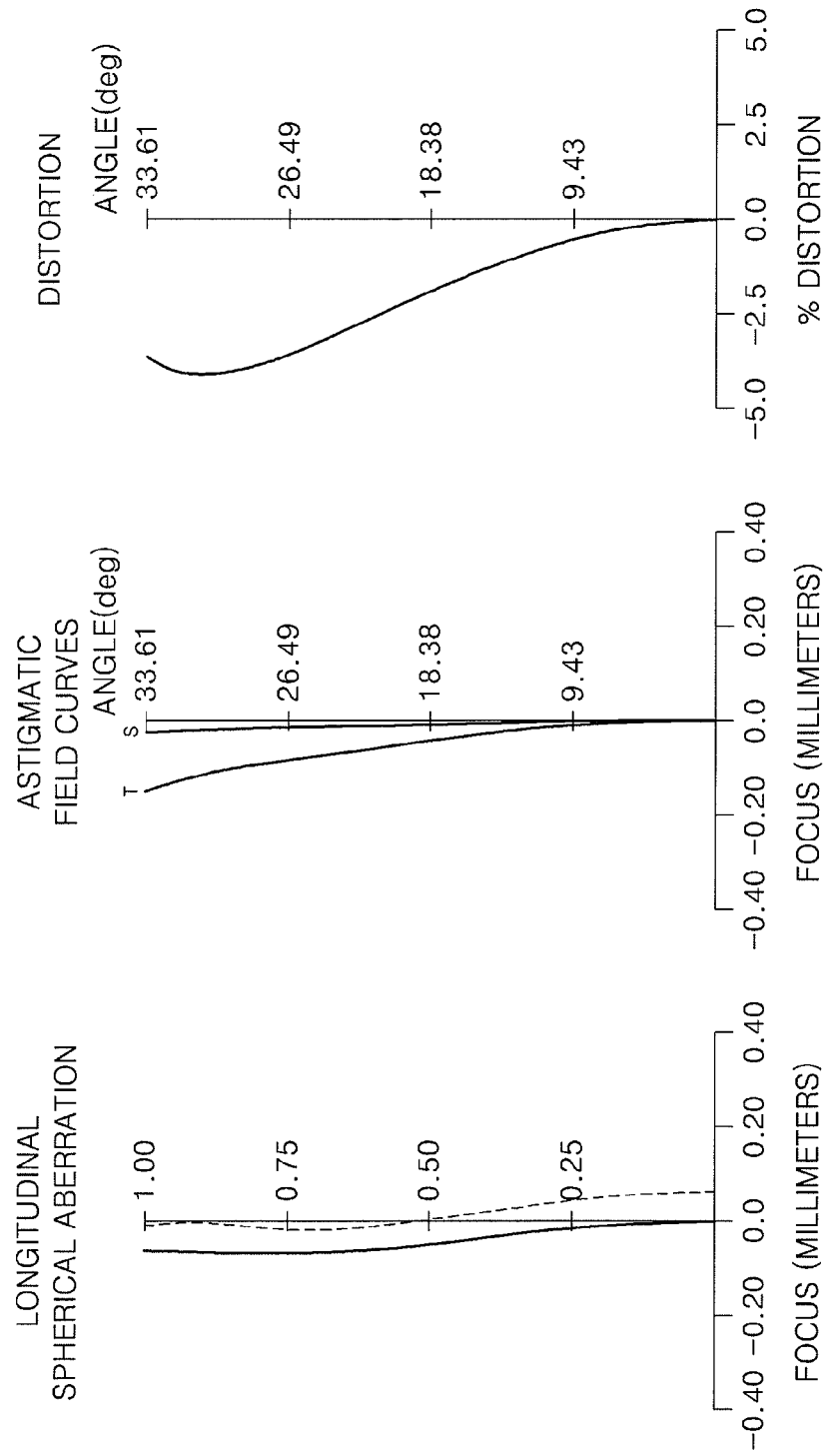

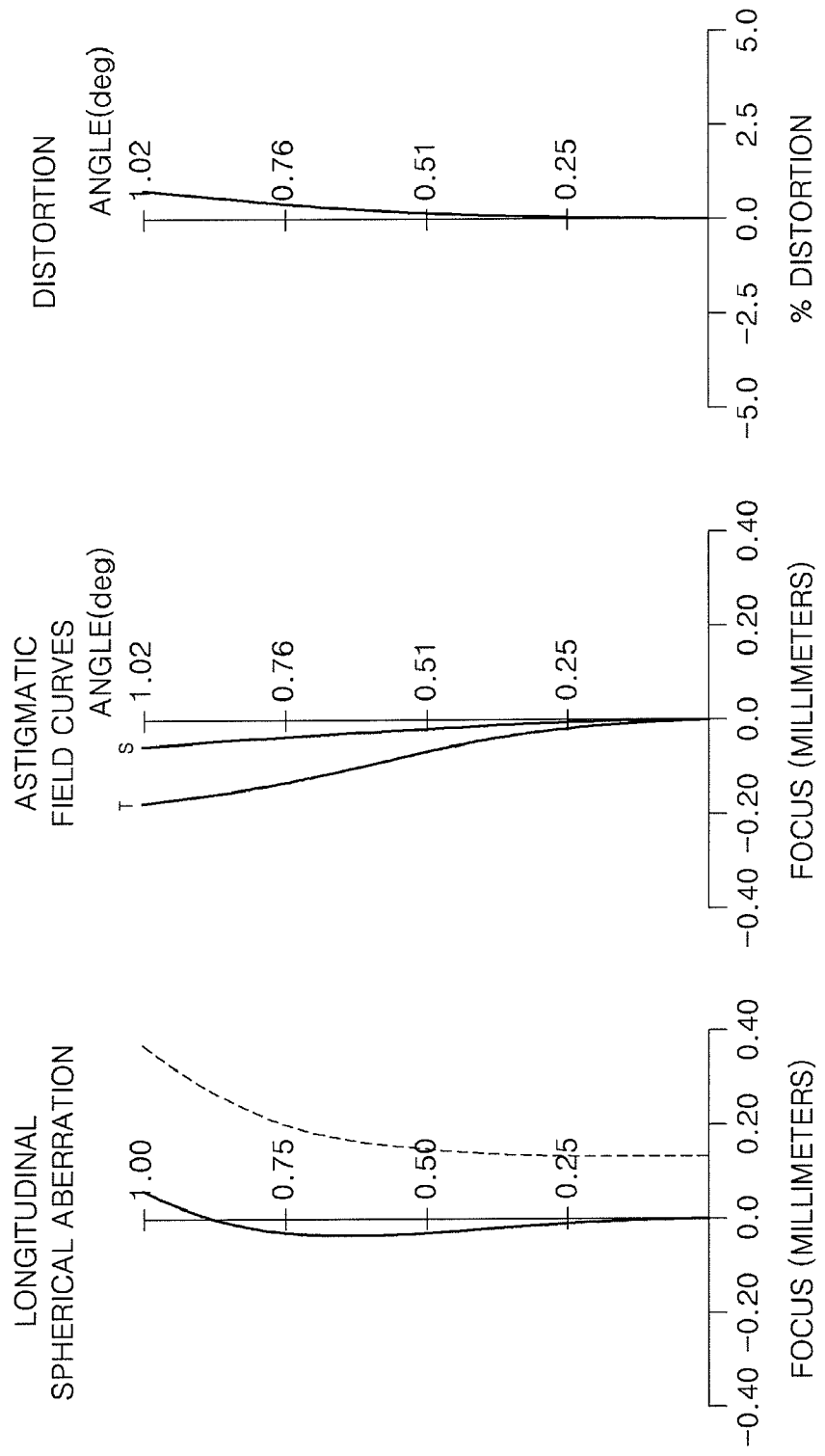

(WIDE ANGLE POSITION)

(MIDDLE POSITION)

(TELEPHOTO POSITION)

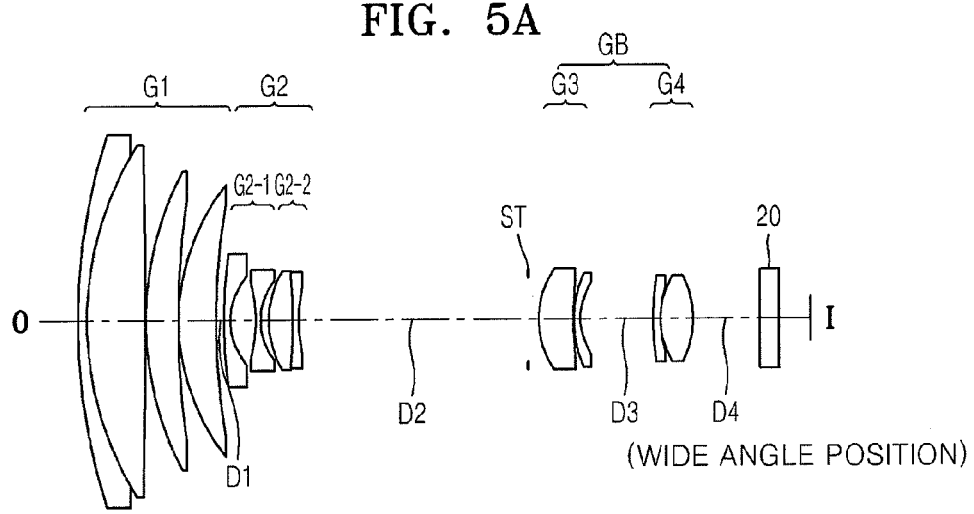
FIG. 5A (WIDE ANGLE POSITION)
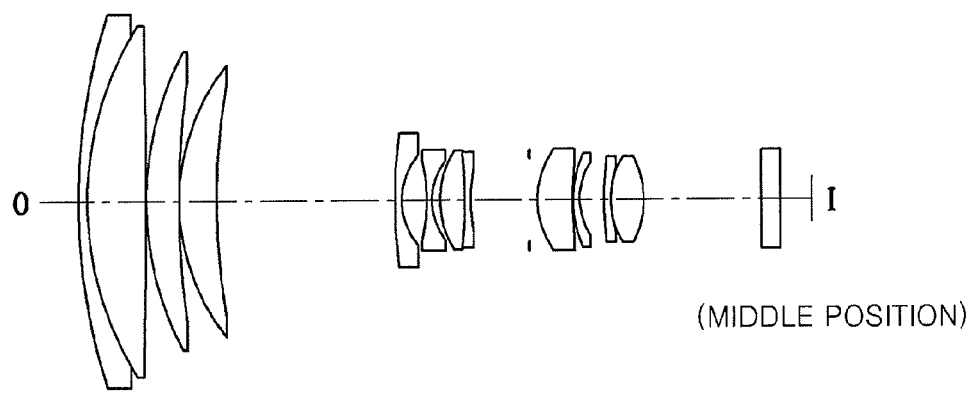
FIG. 5B (MIDDLE POSITION)
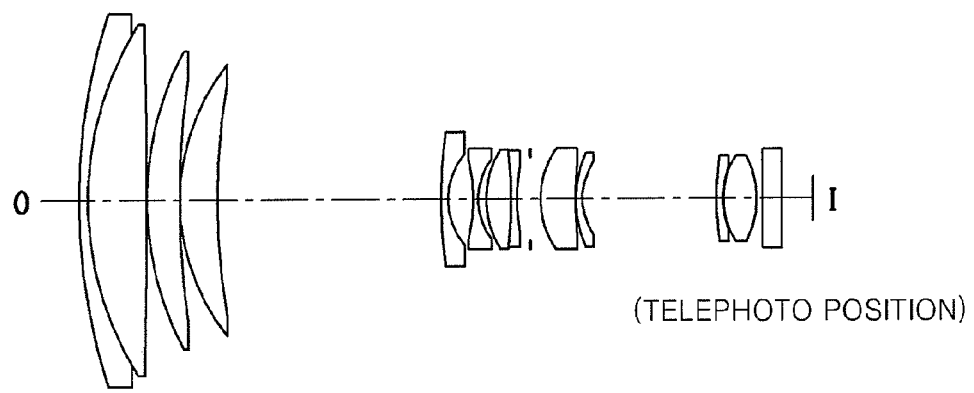
FIG. 5C (TELEPHOTO POSITION)

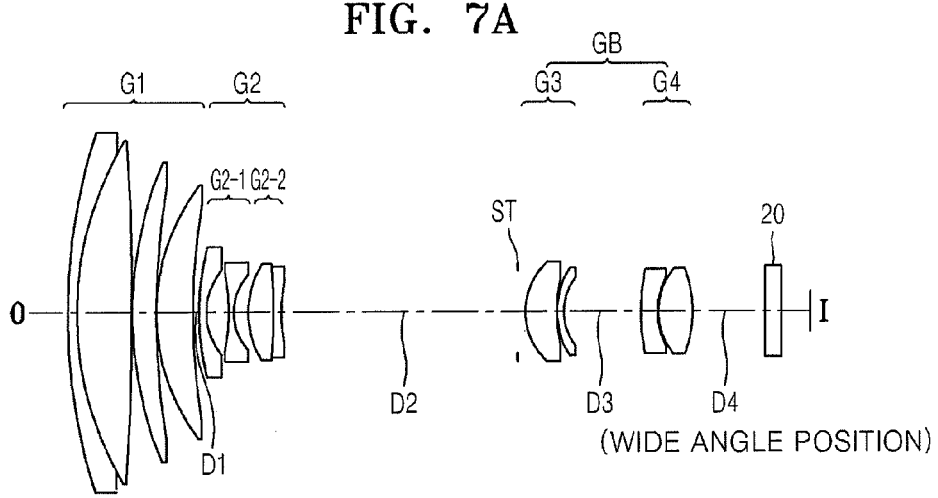
FIG. 7A (WIDE ANGLE POSITION)
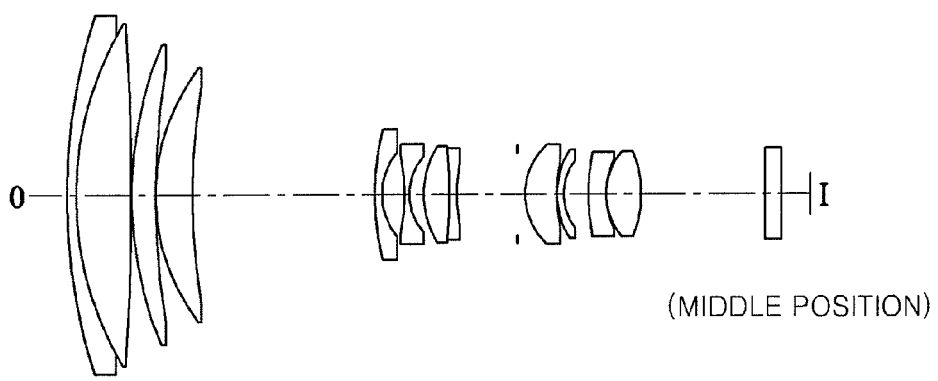
FIG. 7B (MIDDLE POSITION)
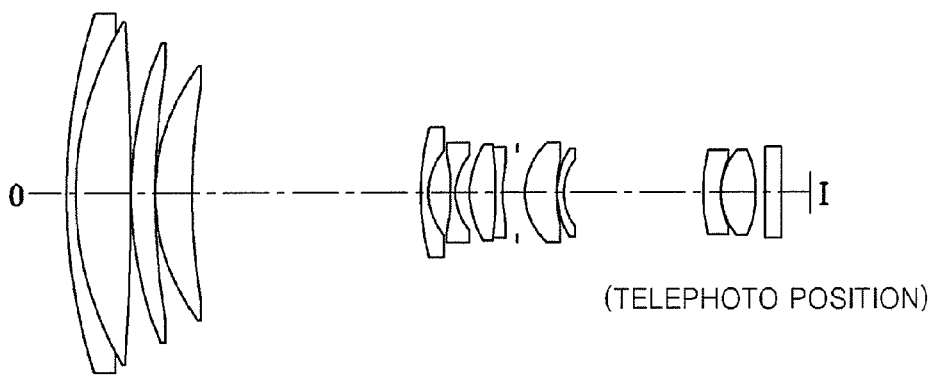
FIG. 7C (TELEPHOTO POSITION)

ZOOM LENS

CROSS-REFERENCE TO RELATED PATENT APPLICATION

This application claims priority from Korean Patent Application No. 10-2009-0047575, filed on May 29, 2009, the disclosure of which is incorporated herein in its entirety by reference.

BACKGROUND

1. Field

Apparatuses consistent with the present invention relate to a zoom lens having a high zoom magnification.

2. Description of the Related Art

Digital cameras, video cameras, monitoring cameras that have solid state pickup devices, such as charge coupled devices (CCDs) or complementary metal-oxide semiconductors (CMOSs), are used widely. Imaging optical apparatuses for use in these cameras are required to be compact, lightweight, and inexpensive. In addition, demand for imaging optical apparatuses providing a high zoom magnification has increased.

SUMMARY

According to one or more exemplary embodiments, there is provided a zoom lens having a high zoom magnification and properly-corrected aberration.

According to an exemplary embodiment, there is provided a zoom lens including, in a sequence from an object side: a first lens group having a positive refractive power; a second lens group having a negative refractive power; and a succeeding lens group having an overall positive refractive power. During zooming from a wide angle position to a telephoto position, an interval between the first lens group and the second lens group increases, and an interval between the second lens group and the succeeding lens group decreases. The first lens group includes at least one negative lens and at least three positive lenses, and the second lens group includes, in a sequence from the object side, a front group having a negative refractive power and a rear group having a positive refractive power; and the zoom lens satisfies at least one of the following expressions:

$$0 < R2al/R2bf < 1; \text{ and}$$

$$0.01 < R2al/ft < 0.25,$$

where $R2al$ denotes a radius of curvature of a lens closest to an image side in the front group of the second lens group, $R2bf$ denotes a radius of curvature of a lens closest to the object side in the rear group of the second lens group, and $ft$ denotes an overall focal length of the zoom lens at the telephoto position.

According to an exemplary embodiment, at least one of the at least three positive lenses of the first lens group may have an Abbe's number of 80 or greater.

According to an exemplary embodiment, the at least one negative lens may be arranged closest to the object side of the first lens group.

According to an exemplary embodiment, the front group of the second lens group may include two negative lenses and the rear group of the second lens group may include a positive lens and a negative lens arranged in a sequence from the object side.

According to an exemplary embodiment, the positive lens and the negative lens of the rear group of the second lens group may be formed as a doublet lens.

According to an exemplary embodiment, when a focal length of the first lens group is f1 and a focal length of the second lens group is f2, the zoom lens satisfies the following expressions:

$$0.2 < f1/ft < 0.43$$

$$0.02 < |f2/ft| < 0.06.$$

According to another exemplary embodiment of the present invention, the succeeding lens group may include, in a sequence from the object side, a third lens group having a positive refractive power and a fourth lens group having a negative refractive power.

According to another exemplary embodiment of the present invention, during zooming from a wide angle position to a telephoto position, the second lens group and the fourth lens group may be moved.

According to another exemplary embodiment of the present invention, during zooming from a wide angle position to a telephoto position, the first lens group and the third lens group may be fixed.

According to another exemplary embodiment of the present invention, the fourth lens group may perform focusing.

According to another exemplary embodiment of the present invention, when a focal length of the third lens group is fb3 and a focal length of the fourth lens group is fb4, the zoom lens satisfies at least one the following expressions:

$$0.15 < fb3/ft < 0.31; \text{ and}$$

$$0.07 < fb4/ft < 0.17.$$

BRIEF DESCRIPTION OF THE DRAWINGS

The above and other aspects of the present inventive concept will become more apparent by describing in detail exemplary embodiments thereof with reference to the attached drawings, in which:

FIGS. 2A, 2B and 2C illustrate longitudinal spherical aberration, astigmatic field curvature, and distortion of the zoom lens of FIG. 1 at the wide angle position, the middle position, and the telephoto position, respectively, according to an exemplary embodiment;

FIGS. 5A, 5B and 5C are cross-sectional views of a zoom lens, according to an exemplary embodiment, at a wide angle position, a middle position, and a telephoto position;

FIGS. 7A, 7B and 7C are cross-sectional views of a zoom lens, according to an exemplary embodiment, at a wide angle position, a middle position, and a telephoto position.

DETAILED DESCRIPTION OF EXEMPLARY EMBODIMENTS

Figure 1A:
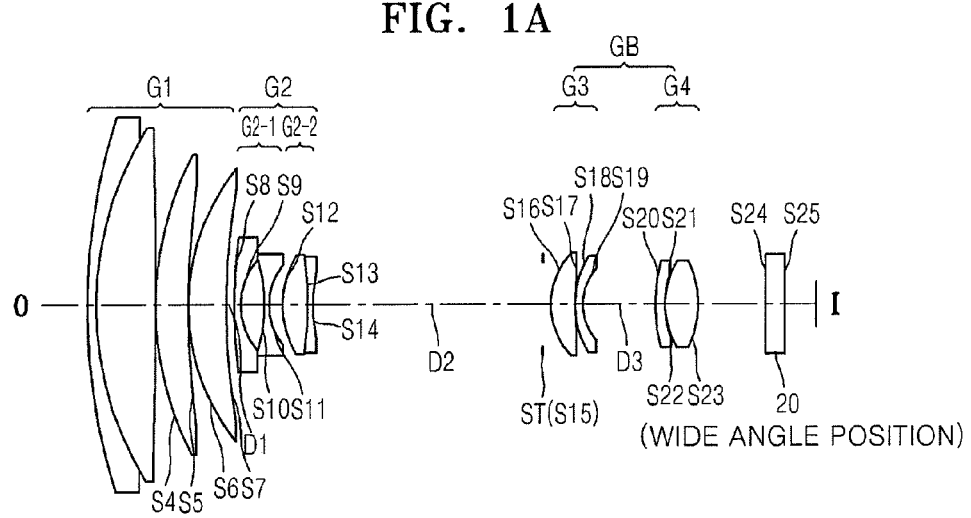
FIGS. 1A, 1B and 1C are cross-sectional views of a zoom lens, according to an exemplary embodiment, at a wide angle position, a middle position, and a telephoto position.

The present inventive concept will now be described more fully with reference to the accompanying drawings, in which exemplary embodiments are shown.

FIG. 1 is a cross-sectional view of a zoom lens, according to an exemplary embodiment, at a wide angle position, a middle position, and a telephoto position. Referring to FIG. 1, the zoom lens according to the present exemplary embodiment may include a first lens group G1 having a positive refractive power, a second lens group G2 having a negative refractive power, and a succeeding lens group GB having an overall positive refractive power. The lens groups G1, G2, and GB are sequentially arranged from an object side O to an image side I.

When zooming is performed from the wide angle position to the telephoto position, a distance between the first lens group G1 and the second lens group G2 increases, and a distance between the second lens group G2 and the succeeding lens group GB decreases.

The first lens group G1 may include a negative lens and at least three positive lenses. The second lens group G2 may include, in a sequence from the object side O, a front group G2-1 having a negative refractive power and a rear group G2-2 having a positive refractive power.

When the zoom lens has a high zoom magnification, large spherical aberration occurs in the first lens group G1 at the telephoto position, and thus, correcting spherical aberration of the entire zoom lens is difficult. Accordingly, the first lens group G1 includes at least three positive lenses in order to distribute positive refractive power, thereby suppressing generation of spherical aberration. In addition, the first lens group G1 includes at least one negative lens in order to suppress generation of spherical aberration in the first lens group G1, thereby facilitating correction of spherical aberration generated at the telephoto position. Moreover, when the negative lens is arranged on the object side O of the first lens group G1, spherical aberration may be efficiently corrected.

The front group G2-1 of the second lens group G2 may include at least two negative lenses on the object side O. The rear group G2-2 of the second lens group G2 may include a positive lens and a negative lens in a sequence from the object side O. The positive lens and the negative lens of the rear group G2-2 may be formed as a doublet lens.

At least two negative lenses of the front group G2-1 of the second lens group G2 are arranged closest to the object side O, whereby correction of negative distortion at the wide angle position becomes easier. In addition, a positive lens and a negative lens are arranged in a sequence from the object side O in the rear group G2-2 of the second lens group G2, whereby generation of spherical aberration in the second lens group G2 is suppressed, and thus, variation of spherical aberration caused during zooming may be reduced.

The zoom lens according to an exemplary embodiment may be configured to satisfy at least one of the following Expressions 1 and 2:

$$0 < R2al/R2bf < 1 \quad \text{[Expression 1]}$$

$$0.01 < R2al/ft < 0.25, \quad \text{[Expression 2]}$$

where R2$al$ denotes the radius of curvature of a lens closest to the image side I in the front group G2-1 of the second lens group G2, R2$bf$ denotes the radius of curvature of a lens closest to the object side O in the rear group G2-2 of the second lens group G2, and ft denotes an overall focal length of the zoom lens at the telephoto position.

By satisfying the condition of Expression 1, an air lens between the front and rear groups G2-1 and G2-2 of the second lens group G2 may have a negative refractive power, and the negative refractive power may be appropriately distributed in the second lens group G2. In addition, generation of spherical aberration in the second lens group G2 is suppressed, and thus, the variation of the spherical aberration caused during zooming may be reduced.

When R2$al$/ft satisfies the condition of Expression 2, negative spherical aberration generated due to R2$al$ may be suitably set, and thus, the spherical aberration in the second lens group G2 is suppressed. Accordingly, variation of spherical aberration caused during zooming may be reduced. In addition, since the negative refractive power in the front group G2-1 of the second lens group G2 may be appropriately distributed, correcting negative distortion generated at the wide angle position becomes easy.

The zoom lens according to an exemplary embodiment may be configured to satisfy at least one of the following Expressions 3 and 4:

$$0.6 < R2al/R2bf < 0.85 \quad \text{[Expression 3]}$$

$$0.03 < R2al/ft < 0.1 \quad \text{[Expression 4]}$$

The first lens group G1 may include at least one positive lens having an Abbe's number of 80 or greater. This facilitates correction of longitudinal chromatic aberration generated at the telephoto position. For example, the first lens group may include at least two positive lenses having an Abbe's number of 80 or greater.

The zoom lens according to an exemplary embodiment may be configured to satisfy at least one of the following Expressions 5 and 6:

$$0.2 < f1/ft < 0.43 \quad \text{[Expression 5]}$$

$$0.02 < |f2/ft| < 0.06 \quad \text{[Expression 6]}$$

Expression 5 represents the ratio of a focal length f1 of the first lens group G1 to the focal length ft at the telephoto position, and, when Expression 5 is satisfied, correcting spherical aberration at the telephoto position becomes easy, and an overall optical length may be easily reduced.

Expression 6 represents the ratio of a focal length f2 of the second lens group G2 to the focal length ft at the telephoto position, and, when |f2/ft| is greater than the lower limit, correcting negative distortion at the wide angle position becomes easy. When |f2/ft| is greater than the upper limit, the amount of movement of the second lens group G2 required for zooming may be reduced, thereby miniaturizing an optical system.

The zoom lens according to an exemplary embodiment may be configured to satisfy at least one of the following Expressions 7 and 8:

$$0.23 < f1/ft < 0.35 \quad \text{[Expression 7]}$$

$$0.03 < |f2/ft| < 0.045 \quad \text{[Expression 8]}$$

The succeeding lens group GB may include, in a sequence from the object side O, a third lens group G3 having a positive refractive power and a fourth lens group G4 having a positive refractive power. Reference numeral 20 denotes a filter.

According to an exemplary embodiment, when the zoom lens according to the above exemplary embodiments is zoomed from the wide angle position to the telephoto position, the fourth lens group G4 may be moved. Due to this zooming, which is performed by the fourth lens group G4, a change in the position of an image plane according to zooming may be reduced.

Alternatively, according to an exemplary embodiment, when the zoom lens according to the above exemplary embodiments is zoomed from the wide angle position to the telephoto position, the first lens group G1 and the third lens group G3 may be fixed and the second lens group G2 and the fourth lens group G4 may be moved. Accordingly, the structure of a lens moving mechanism may be simplified, and the entire optical system including the zoom lens may be miniaturized. During the zooming from the wide angle position to the telephoto position, the interval between the first lens group G1 and the second lens group G2 may increase, and the interval between the second lens group G2 and the third lens group G3 may decrease. In addition, according to an exemplary embodiment, during the zooming from the wide angle position to the telephoto position, the interval between the third lens group G3 and the fourth lens group G4 may have a locus that is concave toward the image side I.

According to an exemplary embodiment, the third lens group G3 may include a stop ST. According to an exemplary embodiment, the fourth lens group G4 may perform focusing. When the fourth lens group G4 performs focusing, zooming and focusing may be performed using the same lens moving mechanism, so that the structure of the mechanism may be simplified and the entire zoom lens may be compact.

The zoom lens according to an exemplary embodiment may be configured to satisfy at least one of the following Expressions 9 and 10:

$$0.15 < fb3/ft < 0.31 \quad \text{[Expression 9]}$$

$$0.07 < fb4/ft < 0.17 \quad \text{[Expression 10]}$$

Expression 9 represents the ratio of a focal length fb3 of the third lens group G3 to the focal length ft at the telephoto position, and, by satisfying Expression 9, securing a back focal length may become easier, and correcting coma may also become easier.

Expression 10 represents the ratio of the focal length fb4 of the fourth lens group G4 to the focal length ft at the telephoto position. By satisfying Expression 10, it may become easy to correct variation in astigmatic field curvature that occurs during focusing, and the amount of movement of lenses required for focusing on a very close location may be reduced, thereby miniaturizing the moving mechanism.

The zoom lens according to an exemplary embodiment may be configured to satisfy at least one of the following Expressions 11 and 12:

$$0.18 < fb3/ft < 0.28 \quad \text{[Expression 11]}$$

$$0.08 < fb4/ft < 0.14 \quad \text{[Expression 12]}$$

The term "aspherical (surface)" described in the exemplary embodiments of the present inventive concept is defined as follows.

When the direction of the optical axis is set to be an x axis direction, a direction perpendicular to the optical axis direction is set to be a y axis direction, and a proceeding direction of a light beam is set to be a forward direction, an aspherical shape of a zoom lens according to an exemplary embodiment may be expressed as Expression 13:

$$\left| x = \frac{cy^2}{1+\sqrt{1-(K+1)c^2 y^2}} + A_4 y^4 + A_6 y^6 + A_8 y^8 + A_{10} y^{10} \right|, \quad (13)$$

where x denotes the distance from an apex of the lens along the x axis, y denotes the distance from the apex of the lens along the y axis, K denotes a conic constant, $A_4$, $A_6$, $A_8$, and $A_{10}$ denote aspherical coefficients, and c denotes a reciprocal (1/R) of the radius of curvature of the apex of the lens.

Detailed data about zoom lenses according to several exemplary embodiments will now be described.

Hereinafter, f is referred to as the overall focal length of the entire zoom lens, Fno is referred to as the F number, $2\omega$ is a viewing angle, R is referred to as the radius of curvature, D is referred to as a center thickness of a lens or an interval between lenses, nd is referred to as a refractive index, vd is referred to as an Abbe's number, ST is referred to as a stop, and D1, D2, D3, and D4 are variable distances.

Embodiment 1

Figure 1B:
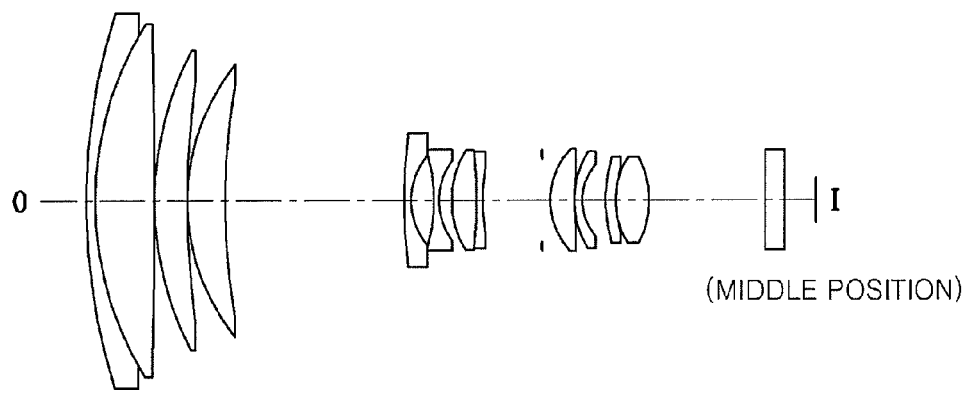
Figure 1C:
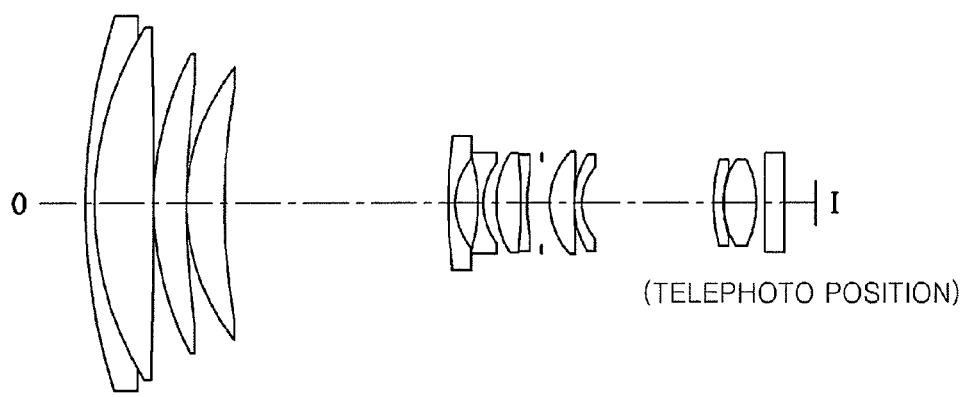

FIGS. 1A, 1B and 1C illustrate zoom lenses, according to an exemplary embodiment, at a wide angle position, a middle position, and a telephoto position.

| Lens surface | R | D | nd | vd |
|---|---|---|---|---|
| S1 | 66.86817 | 1.200 | 1.84666 | 23.8 |
| S2 | 38.16098 | 6.602 | 1.49700 | 81.6 |
| S3 | −1373.59827 | 0.150 | | |
| S4 | 38.33234 | 3.495 | 1.62041 | 60.3 |
| S5 | 108.37417 | 0.150 | | |
| S6 | 26.32758 | 4.009 | 1.49700 | 81.6 |
| S7 | 73.36717 | D1 | | |
| S8 | 42.57972 | 0.800 | 1.88300 | 40.8 |
| S9 | 8.14724 | 2.610 | | |
| S10 | −26.06181 | 0.501 | 1.80420 | 46.5 |
| S11 | 7.77862 | 1.535 | | |
| S12 | 10.12112 | 2.870 | 1.84666 | 23.8 |
| S13 | −35.09253 | 0.501 | 1.88300 | 40.8 |
| S14 | 22.58731 | D2 | | |
| S15 | ST | 1.000 | | |
| S16 | 8.64379 | 2.591 | 1.58913 | 61.3 |
| S17 | 100.00000 | 0.150 | | |
| S18 | 11.20512 | 0.800 | 1.67270 | 32.2 |
| S19 | 6.92804 | D3 | | |
| S20 | 29.30990 | 0.800 | 1.84666 | 23.8 |
| S21 | 10.20742 | 0.150 | | |
| S22 | 7.60820 | 3.567 | 1.58913 | 61.3 |
| S23 | −13.01704 | D4 | | |
| S24 | ∞ | 2.010 | 1.51680 | 64.2 |
| S25 | ∞ | 3.540 | | |

Table 1 shows data regarding variable distances of the zoom lens of FIGS. 1A, 1B and 1C during zooming.

TABLE 1

| f | 3.57 | 32.14 | 127.61 |
|---|---|---|---|
| 2ω(°) | 67.2 | 8.2 | 2.0 |
| Fno | 1.69 | 2.22 | 3.95 |
| D1 | 0.90 | 20.05 | 25.10 |
| D2 | 25.90 | 6.75 | 1.70 |
| D3 | 8.14 | 2.76 | 14.78 |
| D4 | 7.75 | 13.13 | 1.11 |

Table 2 shows aspherical coefficients of the zoom lens of FIGS. 1A, 1B and 1C.

TABLE 2

| Lens surface | R | K | A4 | A6 | A8 | A10 |
|---|---|---|---|---|---|---|
| S16 | 8.64379 | 0.00000 | 7.47648E−05 | −1.64583E−06 | 0.00000 | 0.00000 |
| S17 | 100.00000 | 0.00000 | 2.70888E−04 | −1.85763E−06 | 0.00000 | 0.00000 |
| S22 | 7.60820 | −0.49373 | −1.76554E−04 | −2.19630E−06 | 0.00000 | 0.00000 |

Figure 2B:
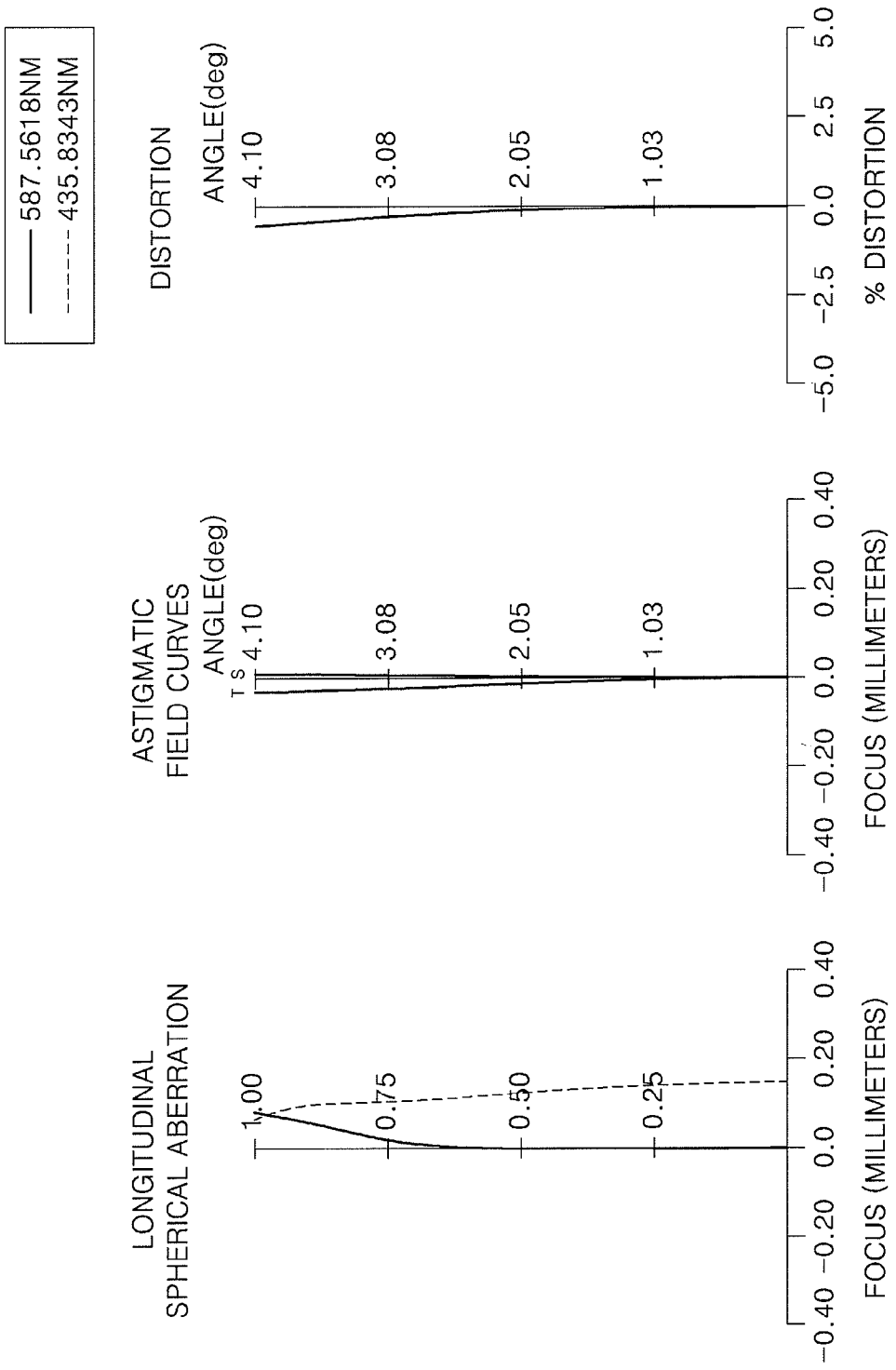

FIGS. 2A, 2B and 2C illustrate longitudinal spherical aberration, field curvature, and distortion of the zoom lens of FIGS. 1A, 1B and 1C at the wide angle position, the middle position, and the telephoto position, respectively. Tangential field curvature (T) and sagittal field curvature (S) are illustrated as the field curvature.

Embodiment 2

Figure 3A:
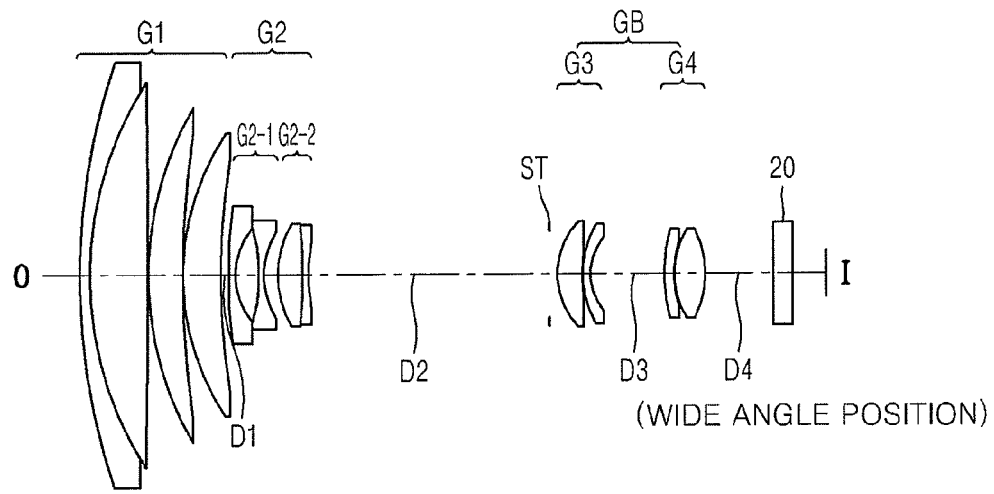
FIGS. 3A, 3B and 3C are cross-sectional views of a zoom lens, according to an exemplary embodiment, at a wide angle position, a middle position, and a telephoto position.
Figure 3B:
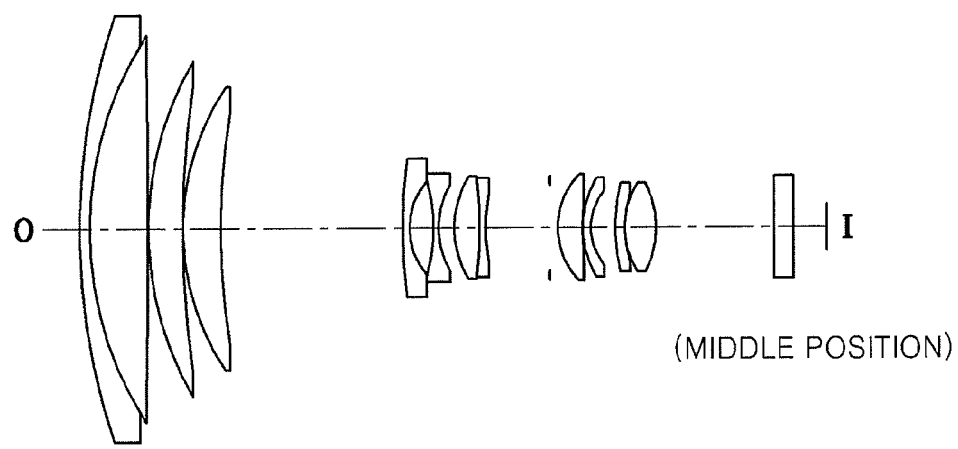
Figure 3C:
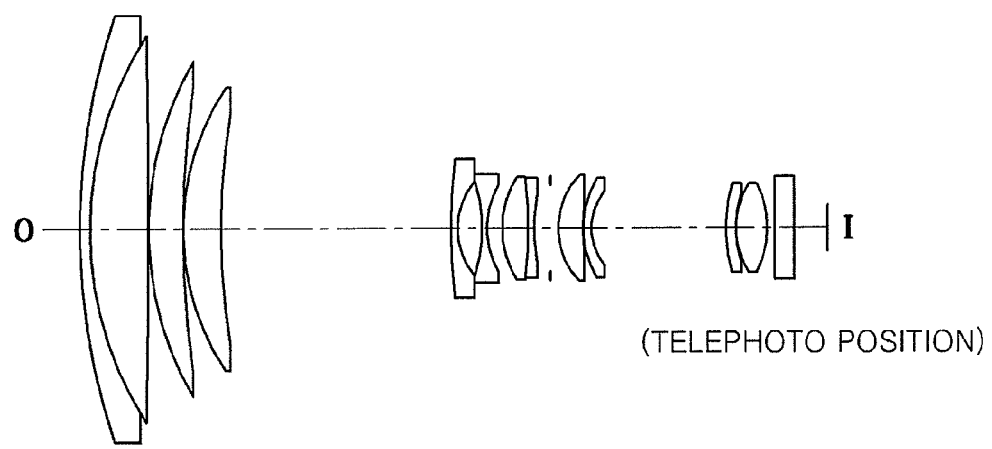

FIGS. 3A, 3B and 3C illustrate zoom lenses, according to another exemplary embodiment, at a wide angle position, a middle position, and a telephoto position.

| Lens surface | R | D | nd | vd |
|---|---|---|---|---|
| S1 | 69.34214 | 1.200 | 1.84666 | 23.8 |
| S2 | 39.01359 | 6.460 | 1.49700 | 81.6 |
| S3 | −805.68442 | 0.150 | | |
| S4 | 38.27748 | 3.449 | 1.62041 | 60.3 |
| S5 | 108.46395 | 0.150 | | |
| S6 | 26.38065 | 3.969 | 1.49700 | 81.6 |
| S7 | 73.85797 | D1 | | |
| S8 | 47.60082 | 0.800 | 1.88300 | 40.8 |
| S9 | 8.31626 | 2.740 | | |
| S10 | −21.43739 | 0.500 | 1.80420 | 46.5 |
| S11 | 8.87530 | 1.592 | | |
| S12 | 11.56647 | 2.948 | 1.84666 | 23.8 |
| S13 | −23.00858 | 0.234 | 1.88300 | 40.8 |
| S14 | −17.60016 | 0.5 | | |
| S15 | 39.81595 | D2 | | |
| S16 | ST | 1.000 | 1.58913 | 61.3 |
| S17 | 8.58934 | 2.668 | | |
| S18 | 52.65432 | 0.150 | 1.67270 | 32.2 |
| S19 | 10.94432 | D3 | | |
| S20 | 7.10492 | 8.140 | 1.84666 | 23.8 |
| S21 | 25.47525 | 0.800 | | |
| S22 | 9.87203 | 0.150 | 1.58913 | 61.3 |
| S23 | 7.48719 | D4 | | |
| S24 | −13.56220 | 2.01 | 1.51680 | 64.2 |
| S25 | ∞ | 2.010 | | |
| S26 | ∞ | 3.54 | | |

Table 3 shows data regarding variable distances of the zoom lens of FIGS. 3A, 3B and 3C during zooming.

TABLE 3

| f | 3.46 | 31.96 | 129.80 |
|---|---|---|---|
| 2ω(°) | 69.2 | 8.2 | 2.0 |
| Fno | 1.71 | 2.30 | 4.16 |
| D1 | 0.90 | 20.14 | 25.16 |
| D2 | 25.94 | 6.70 | 1.70 |
| D3 | 8.14 | 2.77 | 14.77 |
| D4 | 7.76 | 13.18 | 1.06 |

Table 4 shows aspherical coefficients of the zoom lens of FIGS. 3A, 3B and 3C.

TABLE 4

| Lens surface | R | K | A4 | A6 | A8 | A10 |
|---|---|---|---|---|---|---|
| S17 | 8.58934 | 0.00000 | 7.47648E−05 | −1.64583E−06 | 0.00000 | 0.00000 |
| S18 | 52.65432 | 0.00000 | 2.70888E−04 | −1.85763E−06 | 0.00000 | 0.00000 |
| S23 | 7.48719 | −0.49373 | −1.76554E−04 | −2.19630E−06 | 0.00000 | 0.00000 |

Figure 4A:
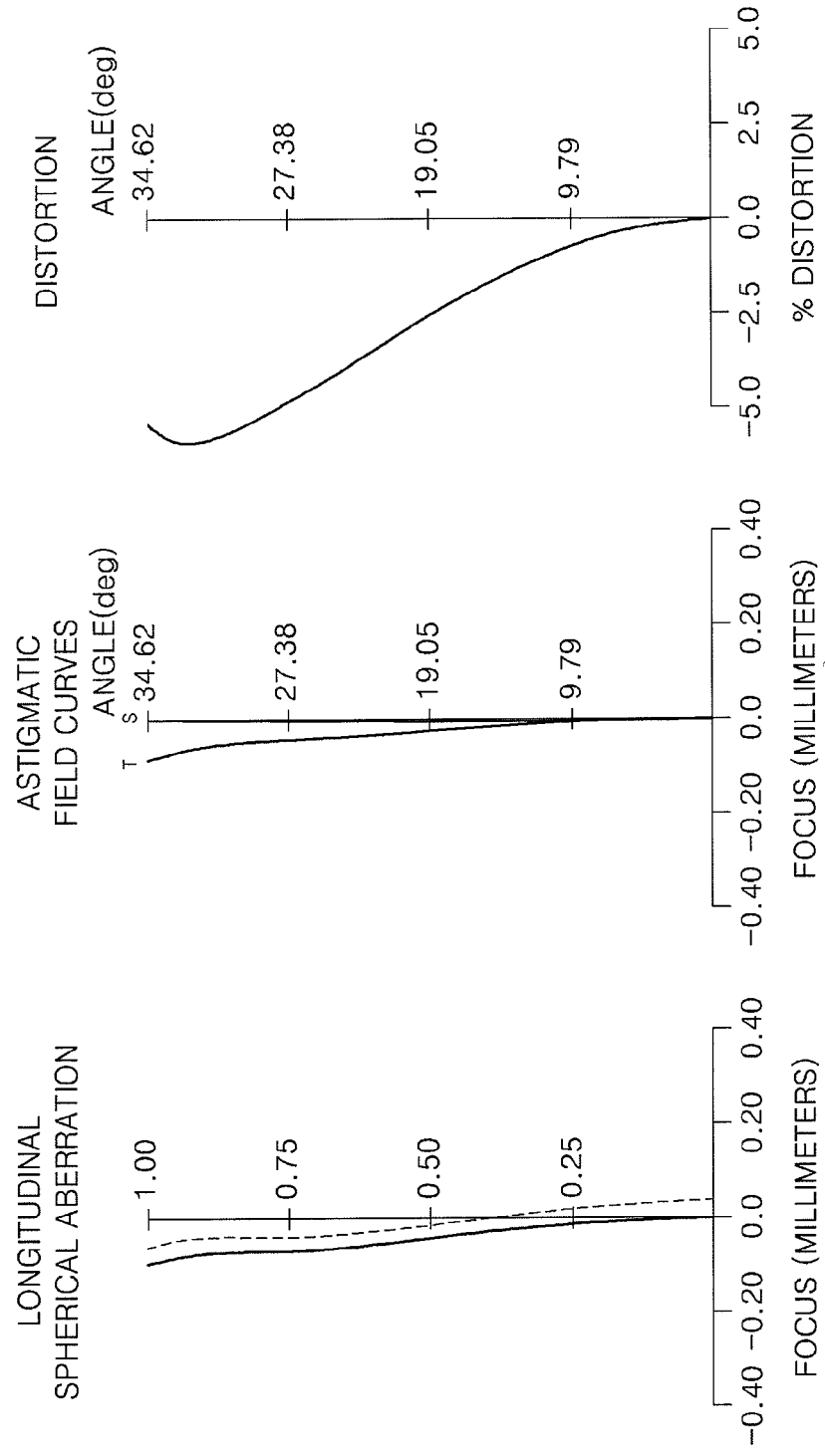
FIGS. 4A, 4B and 4C illustrate longitudinal spherical aberration, astigmatic field curvature, and distortion of the zoom lens of FIGS. 3A, 3B and 3C at the wide angle position, the middle position, and the telephoto position, respectively, according to an exemplary embodiment.
Figure 4B:
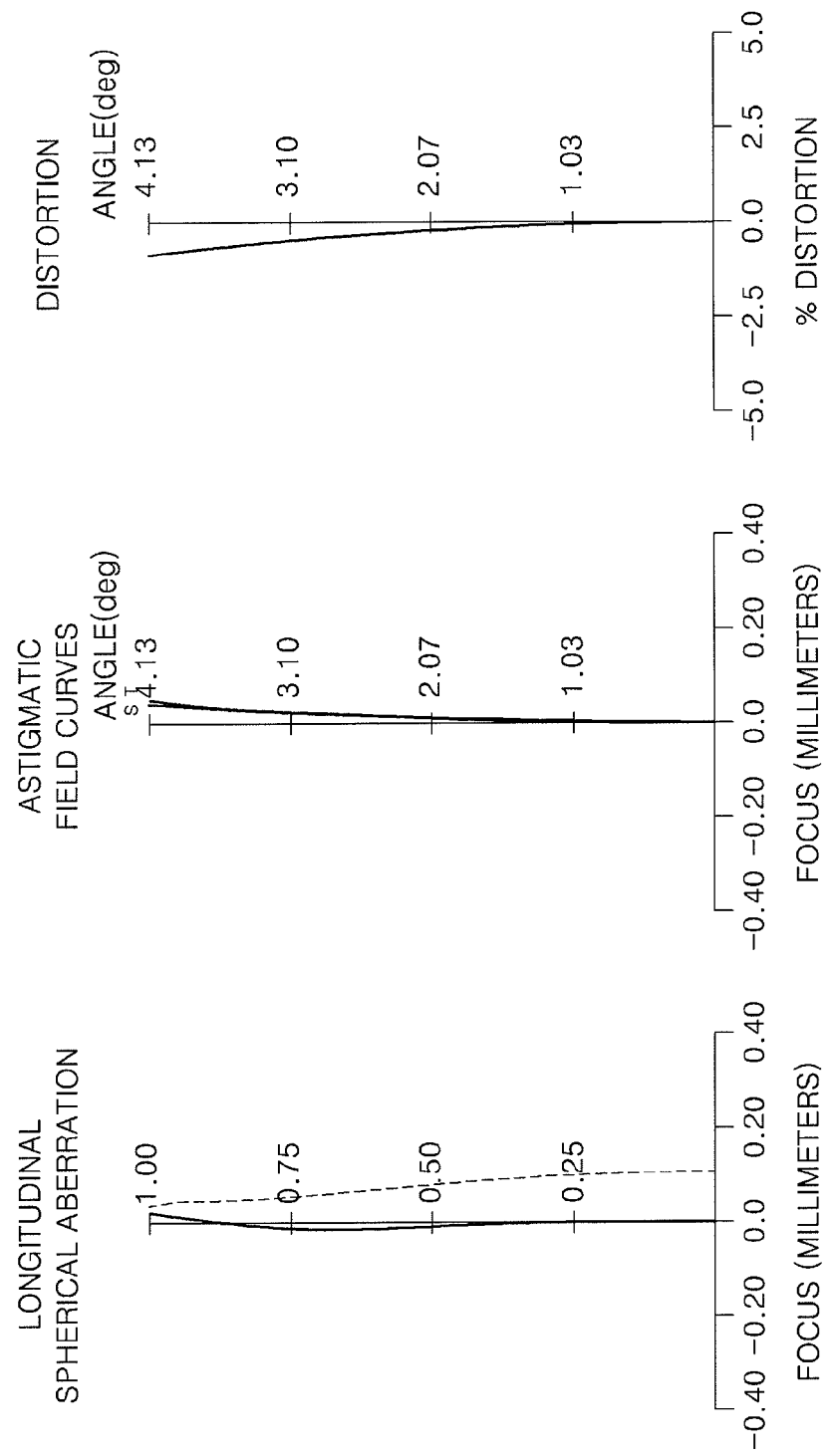
Figure 4C:
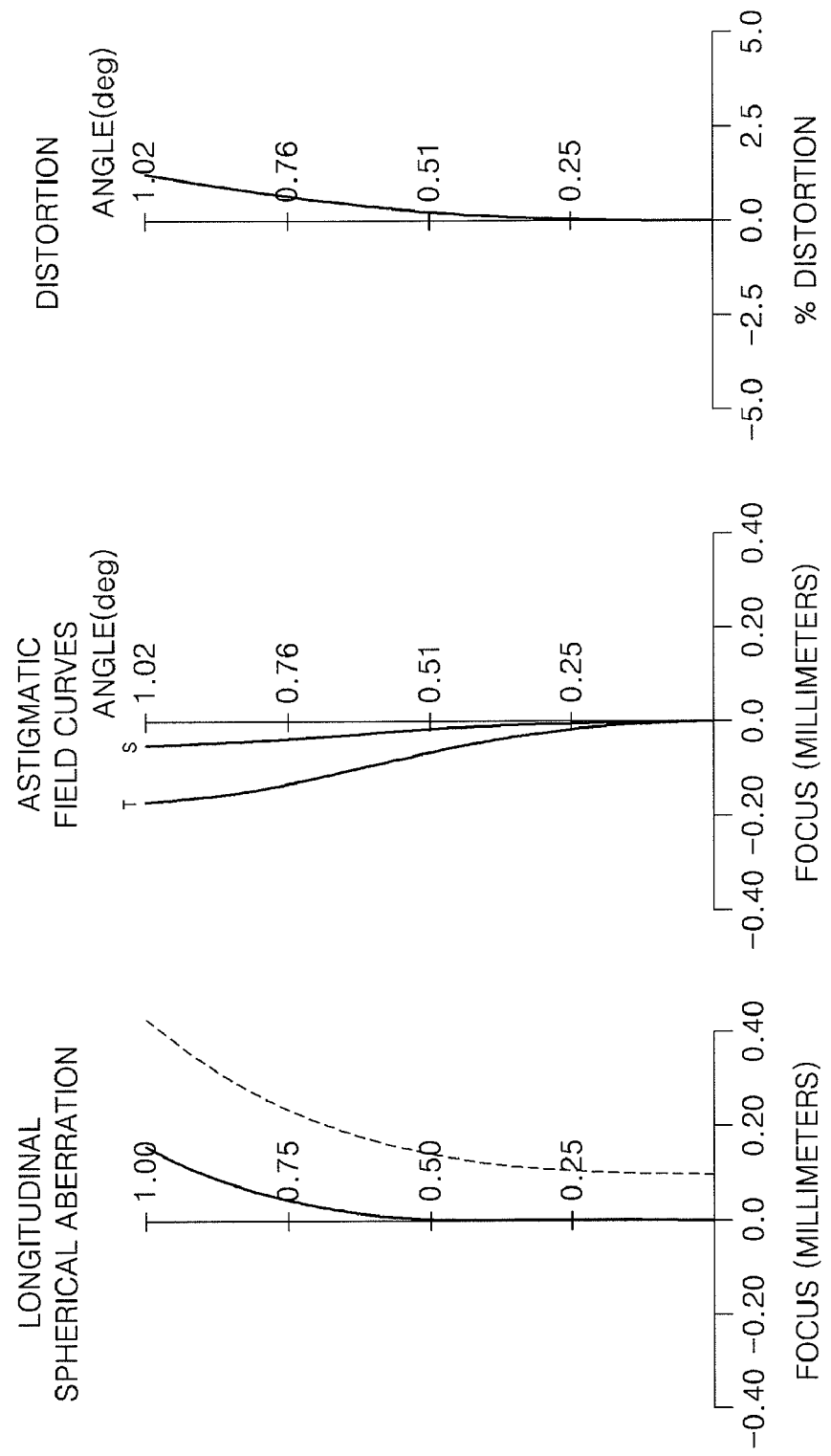

FIGS. 4A, 4B and 4C illustrate longitudinal spherical aberration, field curvature, and distortion of the zoom lens of FIGS. 3A, 3B and 3C at the wide angle position, the middle position, and the telephoto position, respectively.

Embodiment 3

FIGS. 5A, 5B and 5C illustrate zoom lenses, according to another exemplary embodiment, at a wide angle position, a middle position, and a telephoto position.

| | R | D | nd | vd |
|---|---|---|---|---|
| S1 | 71.15271 | 1.200 | 1.84666 | 23.8 |
| S2 | 39.59962 | 6.559 | 1.49700 | 81.6 |
| S3 | −1565.81906 | 0.150 | | |
| S4 | 43.00598 | 3.481 | 1.62041 | 60.3 |
| S5 | 141.27721 | 0.150 | | |
| S6 | 25.01589 | 4.173 | 1.49700 | 81.6 |
| S7 | 72.11603 | D1 | | |
| S8 | 42.57972 | 0.800 | 1.88300 | 40.8 |
| S9 | 7.62444 | 2.998 | | |
| S10 | −16.21954 | 0.500 | 1.80420 | 46.5 |
| S11 | 8.32936 | 0.773 | | |
| S12 | 10.14134 | 3.092 | 1.84666 | 23.8 |
| S13 | −22.58705 | 0.500 | 1.88300 | 40.8 |
| S14 | 51.07584 | D2 | | |
| S15 | ST | 1.000 | | |
| S16 | 9.65447 | 3.944 | 1.58913 | 61.3 |
| S17 | 51.68917 | 0.150 | | |
| S18 | 11.16066 | 0.800 | 1.67270 | 32.2 |
| S19 | 7.86198 | D3 | | |
| S20 | 28.14737 | 0.800 | 1.84666 | 23.8 |
| S21 | 9.86867 | 0.150 | | |
| S22 | 7.56246 | 3.577 | 1.58913 | 61.3 |
| S23 | −12.50943 | D4 | | |
| S24 | ∞ | 2.010 | 1.51680 | 64.2 |
| S25 | ∞ | 3.540 | | |

Table 5 shows data regarding variable distances of the zoom lens of FIGS. 5A, 5B and 5C during zooming.

TABLE 5

| f | 3.57 | 33.70 | 135.00 |
|---|---|---|---|
| 2ω(°) | 67.8 | 7.8 | 1.9 |
| Fno | 1.69 | 2.27 | 4.18 |
| D1 | 0.90 | 20.44 | 25.31 |
| D2 | 26.11 | 6.56 | 1.70 |
| D3 | 8.31 | 2.75 | 15.37 |
| D4 | 8.05 | 13.61 | 1.00 |

Table 6 shows aspherical coefficients of the zoom lens of FIG. 5.

TABLE 6

| Lens surface | R | K | A4 | A6 | A8 | A10 |
|---|---|---|---|---|---|---|
| S16 | 9.65447 | 0.00000 | 7.47648E−05 | −1.64583E−06 | 0.00000 | 0.00000 |
| S17 | 51.68917 | 0.00000 | 2.70888E−04 | −1.85763E−06 | 0.00000 | 0.00000 |
| S22 | 7.56246 | −0.49373 | −1.76554E−04 | −2.19630E−06 | 0.00000 | 0.00000 |

Figure 6A:
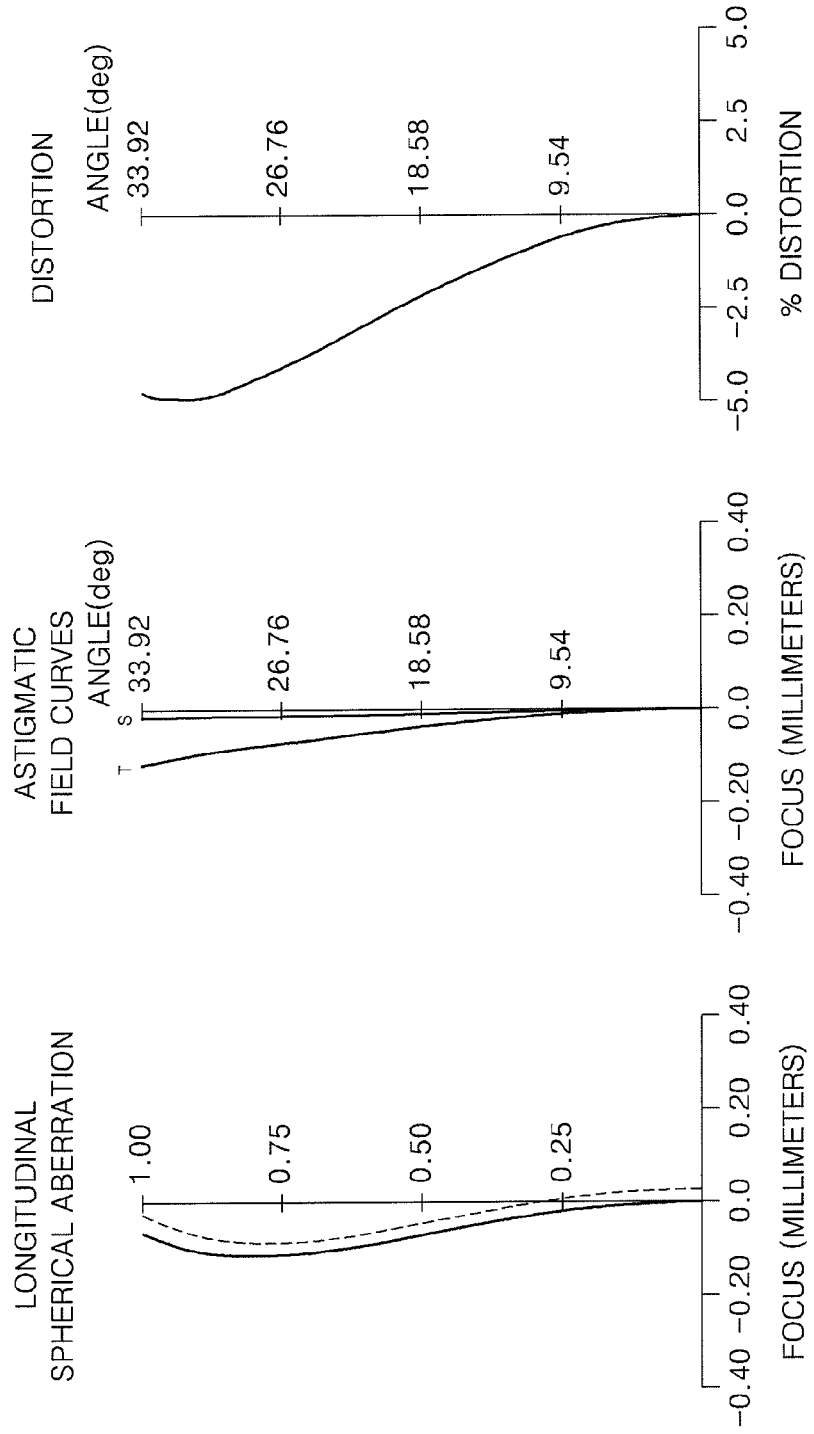
FIGS. 6A, 6B and 6C illustrate longitudinal spherical aberration, astigmatic field curvature, and distortion of the zoom lens of FIGS. 5A, 5B and 5C at the wide angle position, the middle position, and the telephoto position, respectively, according to an exemplary embodiment.
Figure 6B:
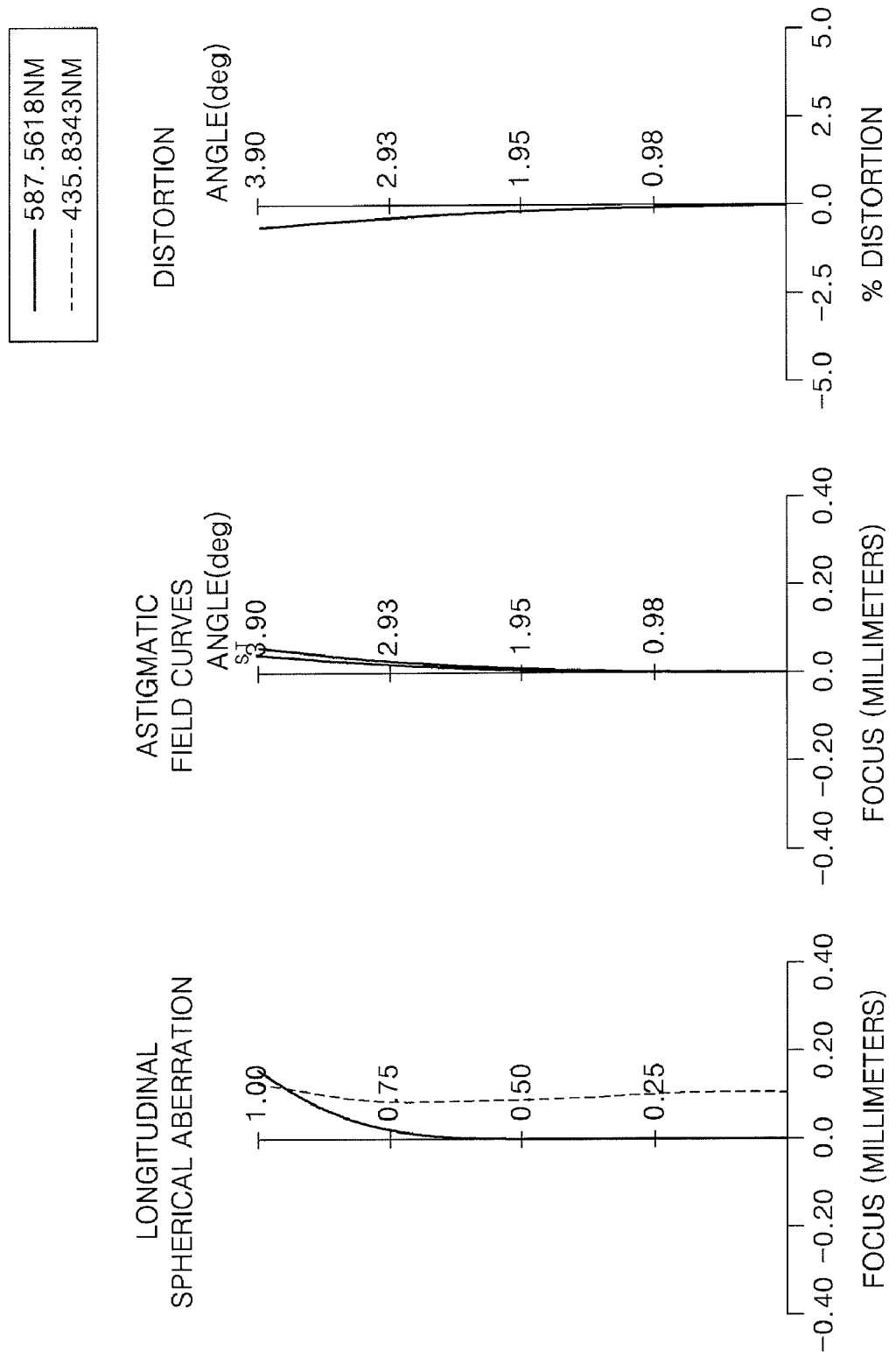
Figure 6C:
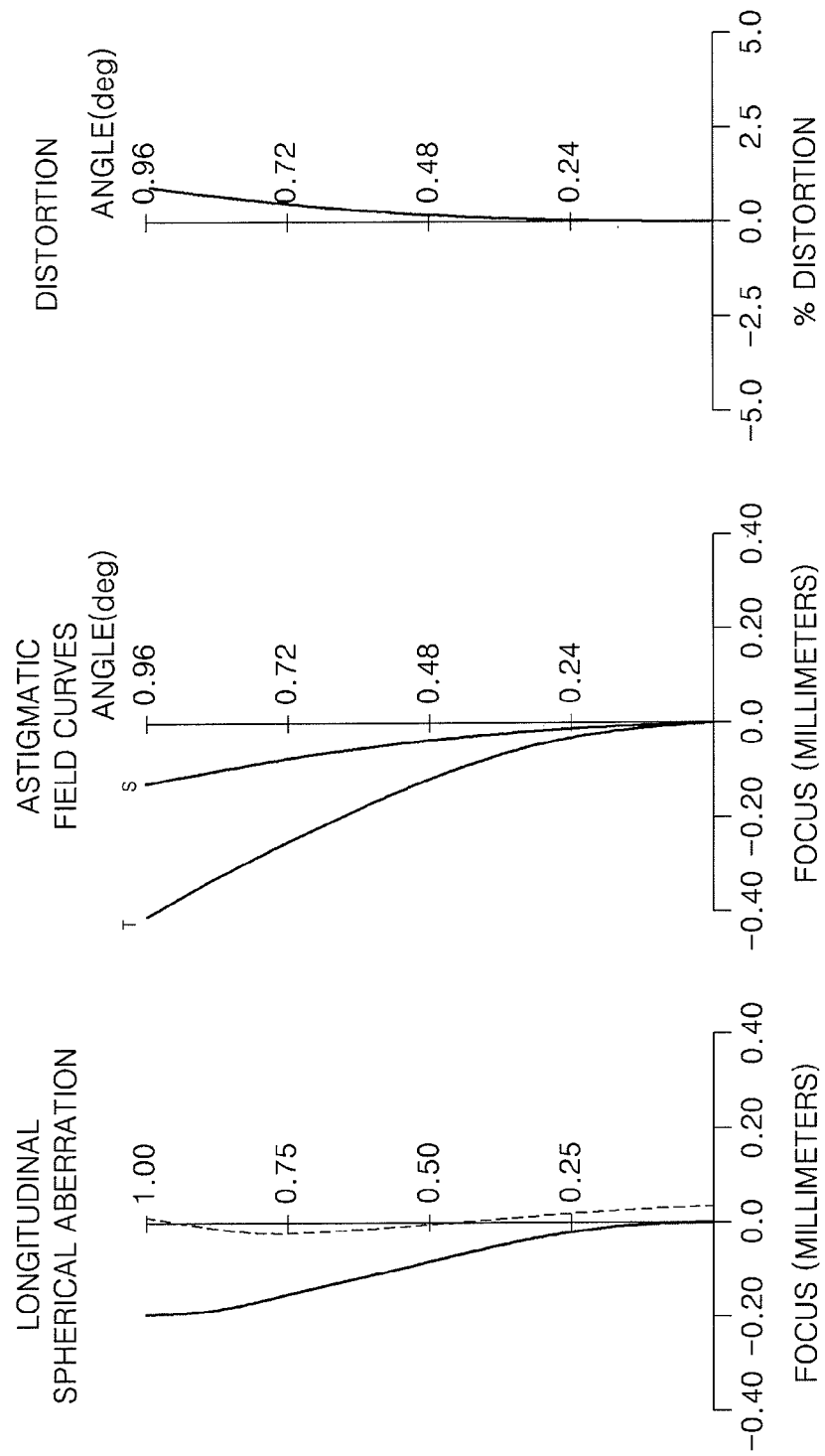

FIGS. 6A, 6B and 6C illustrate longitudinal spherical aberration, field curvature, and distortion of the zoom lens of FIGS. 5A, 5B and 5C at the wide angle position, the middle position, and the telephoto position, respectively.

Embodiment 4

FIGS. 7A, 7B and 7C illustrate zoom lenses, according to another exemplary embodiment, at a wide angle position, a middle position, and a telephoto position.

Table 8 shows aspherical coefficients of the zoom lens of FIG. 7.

TABLE 8

| Lens surface | R | K | A4 | A6 | A8 | A10 |
|---|---|---|---|---|---|---|
| S16 | 9.00366 | 0.00000 | 7.47648E−05 | −1.64583E−06 | 0.00000 | 0.00000 |
| S17 | 27.89627 | 0.00000 | 2.70888E−04 | −1.85763E−06 | 0.00000 | 0.00000 |
| S22 | 7.61215 | −0.49373 | −1.76554E−04 | −2.19630E−06 | 0.00000 | 0.00000 |

Figure 8A:
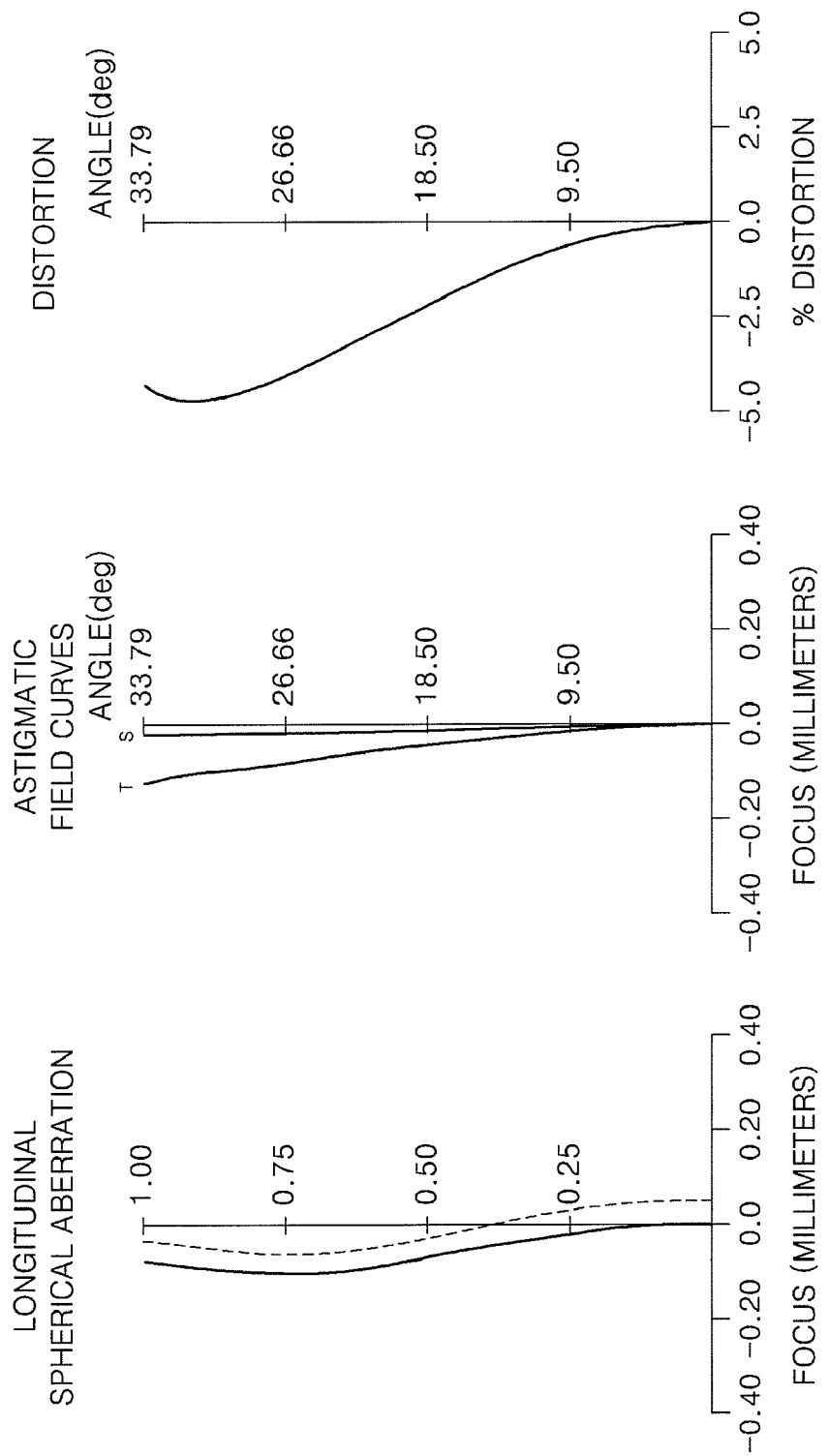
FIGS. 8A, 8B and 8C illustrate longitudinal spherical aberration, astigmatic field curvature, and distortion of the zoom lens of FIGS. 7A, 7B and 7C at the wide angle position, the middle position, and the telephoto position, respectively, according to an exemplary embodiment.
Figure 8B:
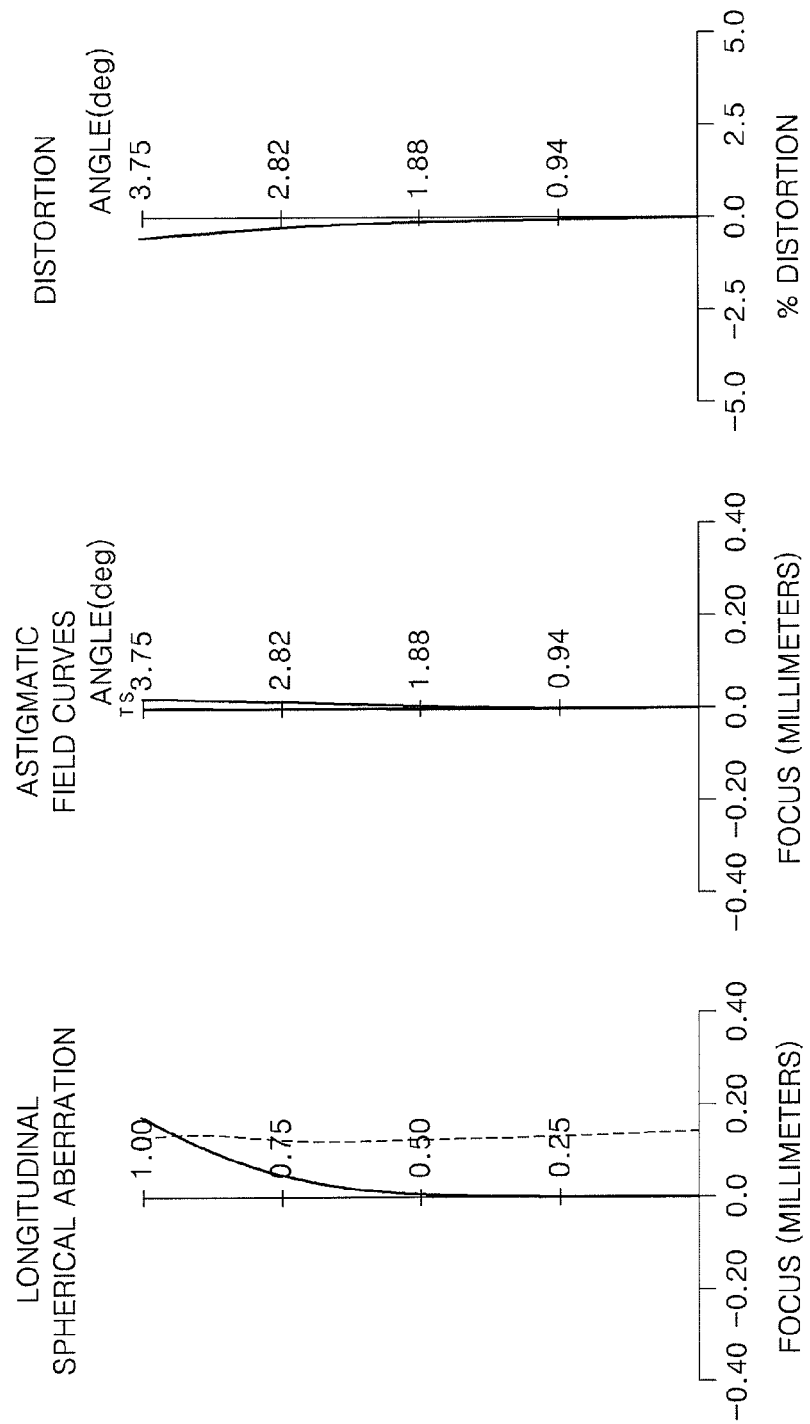
Figure 8C:
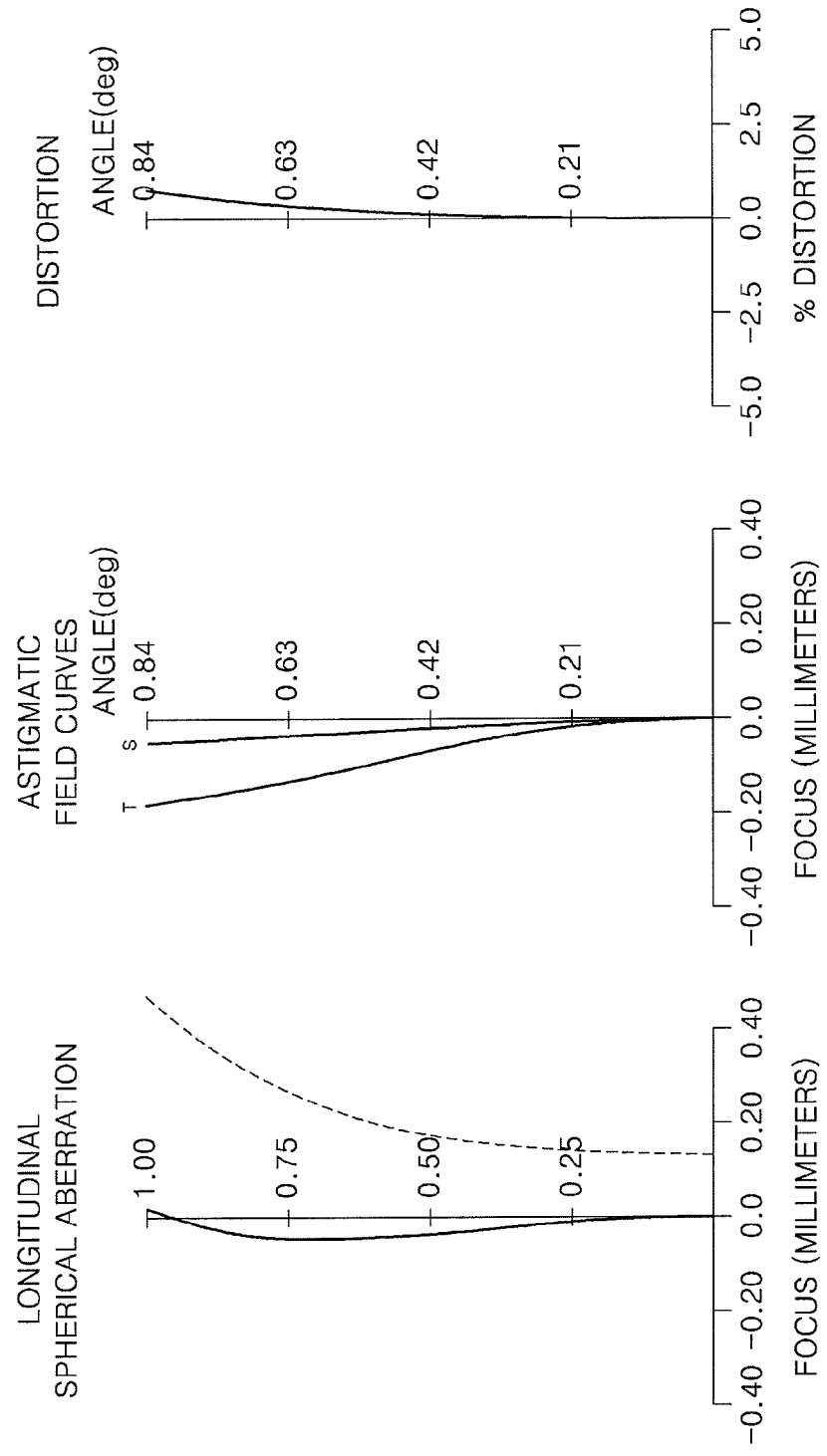

FIGS. 8A, 8B and 8C illustrate longitudinal spherical aberration, field curvature, and distortion of the zoom lens of FIGS. 7A, 7B and 7C at the wide angle position, the middle position, and the telephoto position, respectively.

Tables 9 and 10 show that above embodiments 1, 2, 3, and 4 satisfy Expressions 1 through 10.

| Lens surface | R | D | nd | vd |
|---|---|---|---|---|
| S1 | 71.96497 | 1.200 | 1.84666 | 23.8 |
| S2 | 41.86159 | 6.808 | 1.49700 | 81.6 |
| S3 | −358.84166 | 0.150 | | |
| S4 | 48.94332 | 2.994 | 1.62041 | 60.3 |
| S5 | 108.96407 | 0.150 | | |
| S6 | 26.96792 | 4.197 | 1.49700 | 81.6 |
| S7 | 81.94845 | D1 | | |
| S8 | 42.57972 | 0.800 | 1.88300 | 40.8 |
| S9 | 8.98674 | 2.845 | | |
| S10 | −28.09322 | 0.538 | 1.80420 | 46.5 |
| S11 | 8.14900 | 1.666 | | |
| S12 | 10.70940 | 3.303 | 1.84666 | 23.8 |
| S13 | −36.49990 | 0.850 | 1.88300 | 40.8 |
| S14 | 23.25746 | D2 | | |
| S15 | ST | 1.000 | | |
| S16 | 9.00366 | 3.837 | 1.58913 | 61.3 |
| S17 | 27.89627 | 0.150 | | |
| S18 | 11.39578 | 0.800 | 1.67270 | 32.2 |
| S19 | 7.57139 | D3 | | |
| S20 | 26.72957 | 2.168 | 1.84666 | 23.8 |
| S21 | 10.09279 | 0.150 | | |
| S22 | 7.61215 | 4.248 | 1.58913 | 61.3 |
| S23 | −12.91787 | D4 | | |
| S24 | ∞ | 2.010 | 1.51680 | 64.2 |
| S25 | ∞ | 3.540 | | |

Table 7 shows data regarding variable distances of the zoom lens of FIGS. 7A, 7B and 7C during zooming.

TABLE 7

| f | 3.57 | 35.00 | 155.00 |
|---|---|---|---|
| 2ω(°) | 67.6 | 7.5 | 1.7 |
| Fno | 1.69 | 2.37 | 4.80 |
| D1 | 0.90 | 22.65 | 28.22 |
| D2 | 29.02 | 7.27 | 1.70 |
| D3 | 9.28 | 3.12 | 17.10 |
| D4 | 8.85 | 15.01 | 1.02 |

TABLE 9

| R2bf | 10.12112 | 11.56647 | 10.14134 | 10.70940 |
|---|---|---|---|---|
| ft | 127.61 | 129.8 | 135.00 | 155.00 |
| f1 | 38.141 | 38.05237 | 38.141 | 41.71896 |
| f2 | −5.24296 | −5.14951 | −5.243 | −5.63111 |
| fb3 | 28.01201 | 28.82914 | 29.18837 | 37.20665 |
| fb4 | 14.99999 | 14.80929 | 14.84444 | 14.91003 |

TABLE 10

| Expression | Embodiment 1 | Embodiment 2 | Embodiment 3 | Embodiment 4 |
|---|---|---|---|---|
| R2al/R2bf | 0.769 | 0.767 | 0.821 | 0.761 |
| R2al/ft | 0.061 | 0.068 | 0.062 | 0.053 |
| f1/ft | 0.299 | 0.293 | 0.283 | 0.269 |
| |f2/ft| | 0.041 | 0.040 | 0.039 | 0.036 |
| fb3/ft | 0.220 | 0.222 | 0.216 | 0.240 |
| fb4/ft | 0.118 | 0.114 | 0.110 | 0.096 |

A zoom lens according to the above exemplary embodiments may have a high zoom magnification of 35× to 45× and allow aberration to be properly corrected. The zoom lens according to the above exemplary embodiments may be used in photographing optical systems, such as monitoring cameras, camcorders, and digital cameras. The zoom lens according to the above exemplary embodiments is compact and easily manufactured and has a high zoom magnification and excellent performance.

While the present inventive concept has been particularly shown and described with reference to the exemplary embodiments thereof, it will be understood by those of ordinary skill in the art that various changes in form and details may be made therein without departing from the spirit and scope of the present inventive concept as defined by the following claims.

What is claimed is:

1. A zoom lens comprising, in a sequence from an object side:
   a first lens group having a positive refractive power;
   a second lens group having a negative refractive power; and
   a succeeding lens group having an overall positive refractive power, wherein:
   during zooming from a wide angle position to a telephoto position, an interval between the first lens group and the second lens group increases, and an interval between the second lens group and the succeeding lens group decreases;
   the first lens group comprises at least one negative lens and at least three positive lenses, and the second lens group comprises, in a sequence from the object side, a front group having a negative refractive power and a rear group having a positive refractive power; and
   the zoom lens satisfies at least one of the following expressions:

$0 < R2al/R2bf < 1$; and $0.01 < R2al/ft < 0.25$, where R2al denotes a radius of curvature of a lens closest to an image side in the front group of the second lens group, R2bf denotes a radius of curvature of a lens closest to the object side in the rear group of the second lens group, and ft denotes an overall focal length of the zoom lens at the telephoto position.

2. The zoom lens of claim 1, wherein at least one of the at least three positive lenses of the first lens group has an Abbe's number of 80 or greater.

3. The zoom lens of claim 1, wherein the at least one negative lens is arranged closest to the object side of the first lens group.

4. The zoom lens of claim 1, wherein the front group of the second lens group comprises two negative lenses and the rear group of the second lens group comprises a positive lens and a negative lens arranged in a sequence from the object side.

5. The zoom lens of claim 4, wherein the positive lens and the negative lens of the rear group of the second lens group are formed as a doublet lens.

6. The zoom lens of claim 1, wherein when a focal length of the first lens group is f1 and a focal length of the second lens group is f2, the zoom lens satisfies at least one of the following expressions:

$0.2 < f1/ft < 0.43$; and $0.02 < |f2/ft| < 0.06$.

7. The zoom lens of claim 1, wherein the succeeding lens group comprises, in a sequence from the object side, a third lens group having a positive refractive power and a fourth lens group having a positive refractive power.

8. The zoom lens of claim 7, wherein during zooming from a wide angle position to a telephoto position, the second lens group and the fourth lens group are moved.

9. The zoom lens of claim 8, wherein during zooming from a wide angle position to a telephoto position, the first lens group and the third lens group are fixed.

10. The zoom lens of claim 7, wherein during zooming from a wide angle position to a telephoto position, the first lens group and the third lens group are fixed.

11. The zoom lens of claim 7, wherein during zooming from a wide angle position to a telephoto position, at least one of the second lens group and the fourth lens group are moved.

12. The zoom lens of claim 11, wherein during zooming from a wide angle position to a telephoto position, the first lens group and the third lens group are fixed.

13. The zoom lens of claim 7, wherein the fourth lens group performs focusing.

14. The zoom lens of claim 7, wherein when a focal length of the third lens group is fb3 and a focal length of the fourth lens group is fb4, the zoom lens satisfies at least one of the following expressions:

$0.15 < fb3/ft < 0.31$; and $0.07 < fb4/ft < 0.17$.

15. A zoom lens comprising, in a sequence from an object side:
   a first lens group having a positive refractive power and comprising a plurality of positive lenses and at least one negative lens;
   a second lens group having a negative refractive power and comprising at least one positive lens and at least one negative lens; and
   a succeeding lens group having an overall positive refractive power and comprising at least one positive lens,
   wherein, during zooming from a wide angle position to a telephoto position, an interval between the first lens group and the second lens group increases, and an interval between the second lens group and the succeeding lens group decreases, and
   wherein at least one of the plurality of the positive lenses of the first lens group has an Abbe's number of 80 or greater.

16. The zoom lens of claim 15, wherein a number of the plurality of positive lens of the first lens group is at least three (3), and
   wherein the at least one negative lens of the first lens group is arranged closest to the object side of the first lens group.

17. The zoom lens of claim 16, wherein the second lens group comprises, in a sequence from the object side, a front group having a negative refractive power and a rear group having a positive refractive power, and
   wherein the front group comprises at least two negative lenses and the rear group comprises at least one positive lens and at least one negative lens in a sequence from the object side.

18. The zoom lens of claim 15, wherein the second lens group comprises, in a sequence from the object side, a front group having a negative refractive power and a rear group having a positive refractive power, and
   wherein the front group comprises at least two negative lenses and the rear group comprises at least one positive lens and at least one negative lens in a sequence from the object side.

19. The zoom lens of claim 18, wherein the zoom lens satisfies at least one of the following expressions:

$0 < R2al/R2bf < 1$; and $0.01 < R2al/ft < 0.25$, where R2al denotes a radius of curvature of a lens closest to an image side in the front group of the second lens group, R2bf denotes a radius of curvature of a lens closest to the object side in the rear group of the second lens group, and ft denotes an overall focal length of the zoom lens at the telephoto position.

* * * * *